April 1, 1930. E. T. CORNWELL ET AL 1,752,889
ANTIDAZZLE SPECTACLES
Filed April 18, 1929
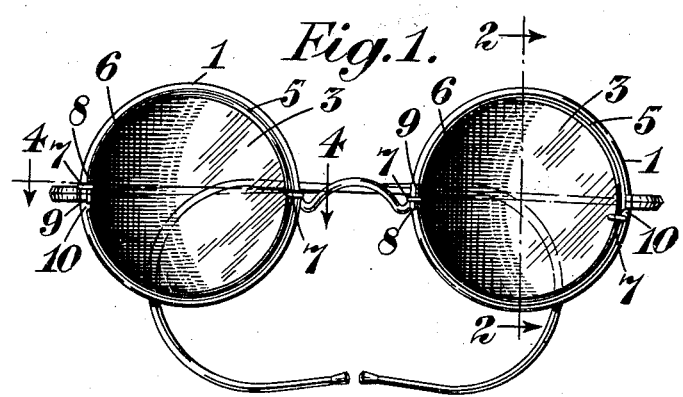
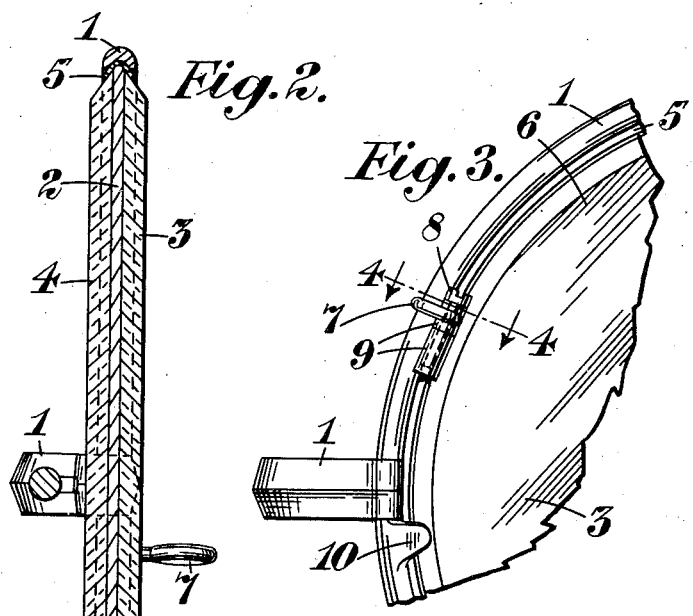
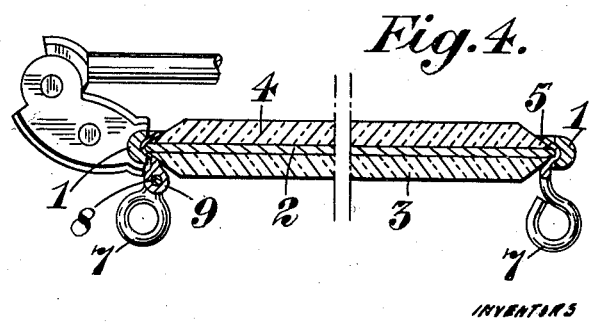
INVENTORS
Edwin T. Cornwell &
Frederick W. Cornwell
By Watson, Cort, Morse & Grindle
ATT'ys Patented Apr. 1, 1930

1,752,889

UNITED STATES PATENT OFFICE

EDWIN THOMAS CORNWELL AND FREDERICK WILLIAM CORNWELL, OF LONDON, ENGLAND

ANTIDAZZLE SPECTACLES

Application filed April 18, 1929, Serial No. 356,252, and in Great Britain April 11, 1928.

This invention is for improvements in or relating to anti-dazzle spectacles of the type comprising dazzle-reducing screens (e. g. tinted glasses) intercepting the vision through the spectacles, which screens are each adapted, for example, by reason of their shape and position in the spectacles, to screen a non-central portion only of the total vision through the spectacles; for example, one half only of the vision, leaving the other half clear. It is to be understood that the expression "spectacles" is employed herein merely for the sake of brevity, and not with the intention of limiting the invention to a construction in which ear-lugs are provided.

The invention has for its object to provide an improvement in anti-dazzle spectacles of the aforesaid type.

According to the present invention, anti-dazzle spectacles of the type referred to above are characterized by the fact that the dazzle-reducing screens are adjustably mounted so as to be movable to vary the direction in which the vision is screened.

Conveniently, the dazzle-reducing screens may each consist of a circular transparent disc tinted at one side and clear at the other and rotatably mounted in or upon the spectacles, for example, rotatable in a rim carried upon, or itself forming part of, the spectacle frame. As will be at once appreciated, the direction in which the vision through the spectacles is screened may be varied by rotating the tinted discs.

According to a feature of the invention, the dazzle-reducing screens may each consist of a disc of clear untinted glass, and in front of this disc, or behind it, a tinted disc of transparent celluloid or like comparatively easily tintable material, with or without a second disc of clear untinted glass on the opposite side of the tinted celluloid or like disc, the two glass discs sandwiching the celluloid or like disc between them and the two discs in the one case, or the three discs in the other, forming together a composite tinted disc.

The accompanying drawing illustrates one embodiment of the invention, which will now be described by way of example.

In the drawing:
Figure 1 is a front view of the spectacles;
Figure 2 is a section on a large scale along the line 2—2 of Figure 1;
Figure 3 is a front view on the same scale showing a detail hereinafter to be referred to, and
Figure 4 is a corresponding section taken along the lines 4—4 of Figures 1 and 2.

The anti-dazzle spectacles comprise a spectacle frame 1 closely resembling an ordinary spectacle frame. Rotatably mounted within the rims of the frame are a pair of composite tinted discs of the following description.

The composite discs each consist of a circular disc 2 of tinted celluloid sandwiched between a front disc 3 and a rear disc 4 of clear untinted glass, the whole being mounted together in a common rim 5, which rim is revolubly mounted in the rim of the spectacle frame. The celluloid disc is tinted, say green, around one side, so as to form a crescent-shaped tinted portion 6 vignetted off towards the centre of the disc and the other side of the disc is clear.

The composite discs are manipulated by the fingers to rotate them in the spectacle framework to vary the direction in which vision through the spectacles is screened, and for this purpose the rotating rims in which the discs are mounted are provided with small projections 7 which can be engaged by the finger nail.

Conveniently, as shewn, the said rotating rims are of the split type and the two ends of the rim are connected together by a screw 8 passing through small abutting connection lugs 9 provided on the two ends of the rim and projecting from the forward or rear edge of the rim clear of the spectacle framework rim, and one of the aforesaid projections 7 for manipulating the discs may, as shewn, be conveniently formed upon one of these lugs.

A small stop 10 is provided on the edge of each spectacle rim to limit the movement of the inner rim the projecting lug 7 on the inner rim abutting against the stop in the two extreme positions of the rim.

Various modifications may obviously be made without departing from the spirit and scope of this invention. For example, the dazzle-reducing screens may be composed wholly of celluloid or like material, or wholly of glass. Also, instead of the screens taking the form of discs tinted over a portion of their surface, the screens may take the form of separate pieces of transparent tinted material so positioned in the vision through the spectacles as to screen a non-central portion only of said vision. It is also to be understood that the invention includes a fitting to be applied as an attachment to ordinary spectacles. For example, the fitting for this purpose could comprise a tinted disc, as described above, the enclosing rim of which is provided with small lugs of such form as will enable them to be sprung over the rim, or in the case of rimless spectacles or eye-glasses, over the periphery of the lens, thereby temporarily attaching the screen to the spectacles, the lugs, moreover, being positioned, of course, to enable the disc to be rotated upon the spectacle rim.

We claim:—

In an eyeglass the combination with a circular supporting rim, of a second split rim rotatably mounted within said first rim and adapted to receive a light transmitting disc, means for connecting the ends of said split rim to rigidly clamp the disc therein, means projecting from and integral with a portion of said last named means by which said split rim may be rotated within said supporting rim, a false rim rotatably mounted within the circular supporting rim, a circular disc of transparent non-rigid sheet material mounted in the false rim and tinted at one side and clear at the other so as to shield a non-central portion only of the total vision through the rim, the tinted portion being vignetted off toward the central portion of said disc, and a pair of discs of glass also mounted in the false rim sandwiching face-to-face the tinted disc between them, the false rim with the discs mounted within it being adjustable by rotation in the circular supporting rim carrying it to vary at will the direction in which the vision through the latter is shielded.

In testimony whereof we have signed our names to this specification.

EDWIN THOMAS CORNWELL.
FREDERICK WILLIAM CORNWELL.